Patented June 17, 1924.

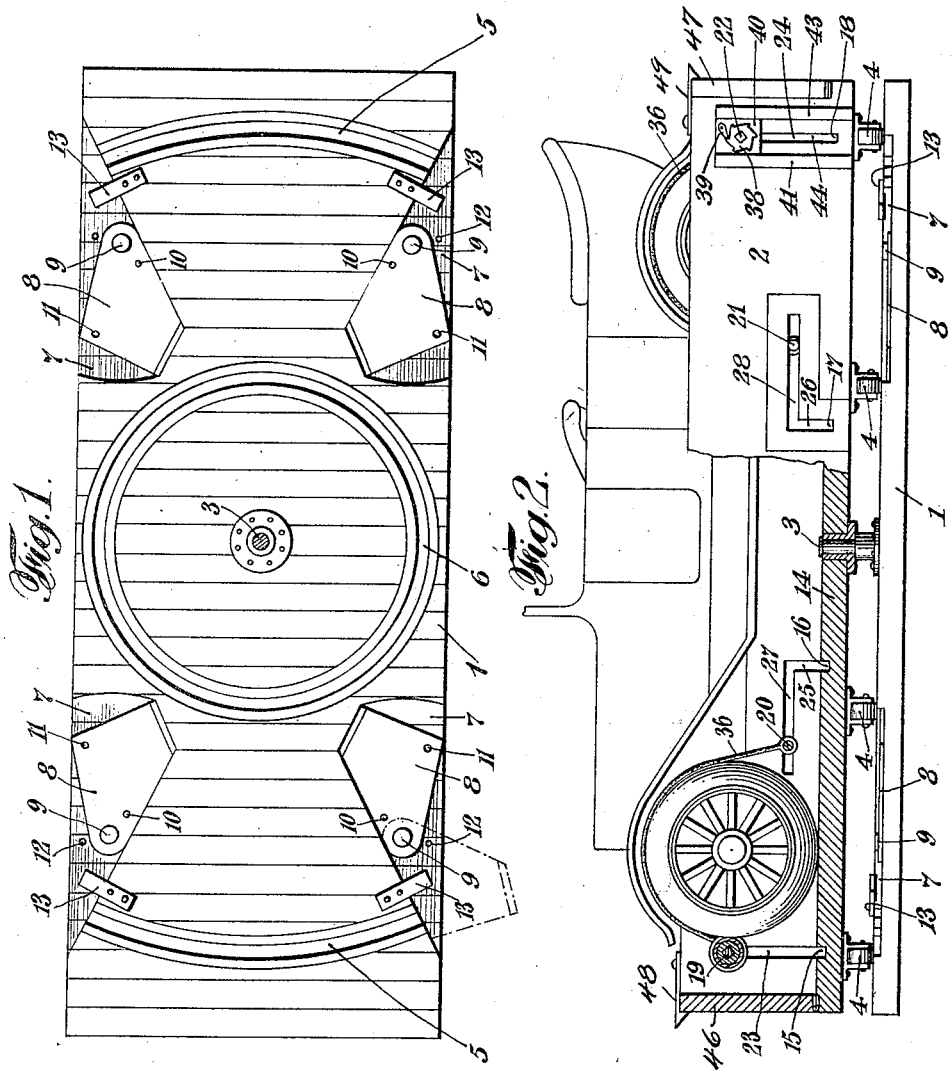

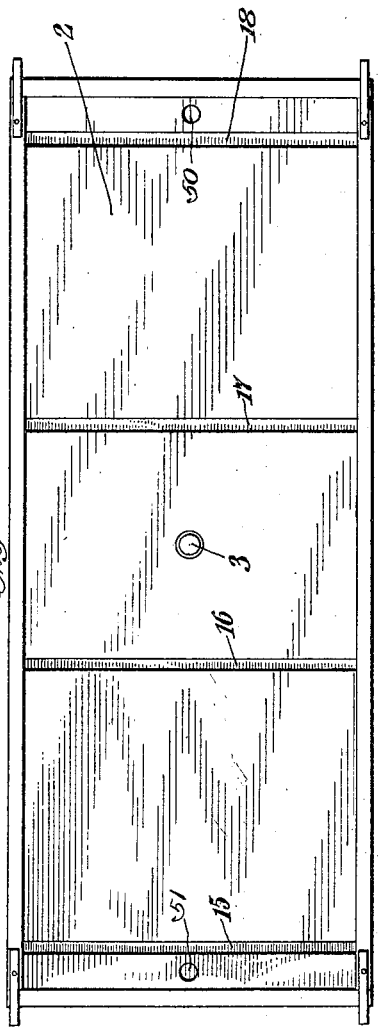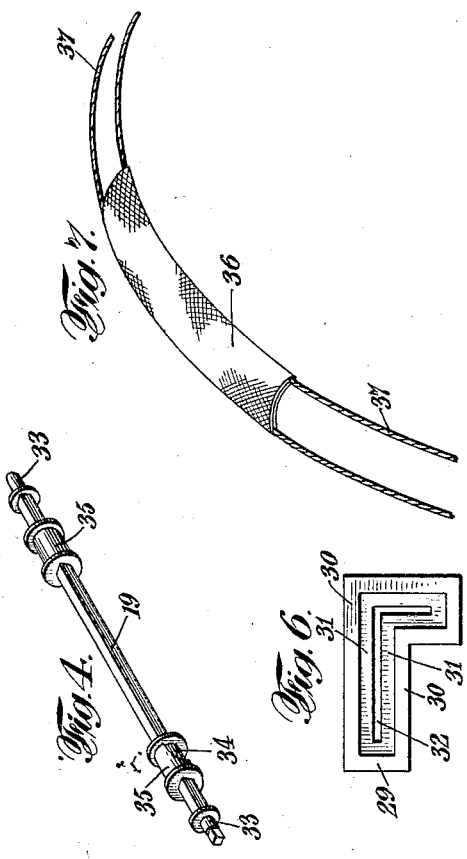

1,498,087

UNITED STATES PATENT OFFICE.

CHARLES FOWLER, OF NEW YORK, N. Y.

MEANS FOR HOLDING VEHICLE WHEELS TO FLOORS, PLATFORMS, ETC.

Application filed April 11, 1922, Serial No. 551,663. Renewed November 1, 1923.

*To all whom it may concern:*

Be it known that I, CHARLES FOWLER, a citizen of the United States, a resident of New York, in the county of New York and State of New York, have invented a certain new and useful Means for Holding Vehicle Wheels to Floors, Platforms, Etc.

This invention relates to means for firmly holding the wheels of vehicles to floors, platforms, car floors, and other surfaces while at rest or during transit.

The invention in one of its embodiments is illustrated in the accompanying drawings which form part of the specification, and in said drawings—

Figure 1 represents a floor of a car such as a freight car which is provided with tracks to support a turntable;

Fig. 2 represents an elevation partly in section of a portion of a freight car containing a vehicle;

Fig. 3 is a plan view of the floor of the turn-table;

Fig. 4 is a view of a locking bar used to tighten locking bands around the wheels of vehicles stationed within the car;

Fig. 5 is a view of an end portion of the car showing means for tightening and rotating the locking bar;

Fig. 6 is a view of a plate adapted to be fastened to a side of the car, and

Fig. 7 is a perspective of a locking band.

In said drawings there is shown a floor 1 of a freight car such as a flat car, and above this floor is mounted a turn-table 2 for rotation upon a pivot pin 3. Wheels 4 are mounted upon the under side of the turn-table for travel in outer tracks 5 and inner track 6 both on the floor 1. The said floor has recesses 7 at each corner thereof as shown in Fig. 1, and in these recesses are provided plates 8 lying flush with the top of the said floor 1 and positioned to turn about pivots 9. These plates 8 may extend outwardly beyond the said floor as shown in dotted lines and onto a suitable platform provided level with the said floor and adjacent thereto so that the car floor may be bridged to the platform. The plates 8 have bolt holes 10 therein and bolt holes 11, the latter for the purpose of securing the plates within the recesses by bolts extending into the said floor of the car, and the former for the purpose of receiving bolts passing through the corresponding holes 12 in the said floor of the car when the plates 8 are moved outwardly. Plates 13 are provided to extend over the plates 8 to more securely hold them in operative position.

The turn-table 2 has a floor 14 parallel to and positioned above the said floor 1, and the floor 14 is provided with certain grooves 15, 16, 17, and 18 for the purpose of receiving rods or locking bars 19, 20, 21, and 22 to be described later, these grooves being deep enough to allow a lowering of said rods below the level of the floor of the turn-table so as to be out of the way of the vehicle wheels. Corresponding with these grooves are slots which may be in the sides of the car, the slots 23 and 24 corresponding with grooves 15 and 18, and the slots 25 and 26 corresponding with the grooves 16 and 17. The slots 25 and 26 have horizontal extending portions 27 and 28 in order to permit the rods 20 and 21 to move horizontally towards the vehicle wheels. These L-shaped slots may be covered on the outside of the car by plates 29 of corresponding shape, the portions or surfaces 30 thereof being attached directly against the outside of the car, and the surface 31 which constitutes a recess being for the purpose of receiving the head of the locking bar to be described. The floor 14 may of course be provided with suitable means for locking it in alinement with the floor 1, such as pins 50 and 51 inserted through holes in the floor of the turn-table and entering corresponding holes in the floor of the car. The slot 32 is adapted to receive the end portion of the bar itself.

The locking bars 20 and 21 are rods of any suitable character provided with round heads which fit within the recesses 31, but the bars 19 and 22 are more fully shown in Fig. 4, and as there shown they are square in cross section except at the ends where they are round as at 33, these round ends serving to pass through slots 23 and 24. Upon a rectangular section are mounted collars 34 which may be provided with additional metallic bands 35 also circular in form for the purpose of reducing friction when in contact with the vehicle wheels.

After a vehicle has been run onto the car, its wheels are brought into the position shown in Fig. 2, and then fabric bands 36 provided with cords 37 are passed over the wheels and the cords are tied to the locking bars. The locking bar 19 is then rotated to wrap the cords 37 around the collars until the bands 36 are tightened against the wheels. By continued rotation of the locking bar 19, it is caused to move upwardly in the slot 23 until it abuts against the vehicle wheels themselves, thereby securely holding the latter down to the floor of the car so that they cannot move.

The means for rotating the locking bars at the ends of the car are shown in Fig. 5, and there may be several of these locking devices. The bar 22 has provided thereon at the outside of the turn-table a ratchet wheel 38 cooperating with a pawl 39 fixed upon a vertically sliding plate 40 mounted in guideways 41 and 42 formed by bent-over portions of an exterior plate 43 fastened to the outside of the car. This plate 43 has cut therein a vertical slot 44 corresponding to the vertical slot 24. A crank 45 is fixed to the end of the bar 22 for rotating it, and it will be seen that it will finally move upward with the plate 40 due to the resistance encountered by the bands 36 on the wheels. The ratchet and pawl arrangement of course prevents any backward motion. The bars 20 and 21 are of course not provided with this turning means as it is unnecessary. The arrangement at each end of the car may of course be the same.

By this means there is provided on the floor and sides of the car a positive and quick means of fastening the vehicle wheels securely down against any possibility of movement. When the vehicle is ready to be taken from the car, the pawl may be disengaged and the bands 36 quickly released and pushed to one side without untying them from the crank bars. The latter may be quickly shoved along the slots, into the grooves in the floor of the car, and there will be no obstruction in the way of the wheels of the vehicle which may then be quickly removed by turning the car or turntable in any desired direction. The ends 46 and 47 of the car may be let down to facilitate the removal of the vehicle onto a receiving platform, these ends being securely held up by holding means 48 and 49.

As many apparently widely different embodiments of this invention may be made without departing from the spirit thereof, and as the above described locking means may be applied to other floors besides car floors, it is to be understood that I do not intend to limit myself to the specific embodiment thereof except as indicated in the appended claims.

I claim:

1. A wheel locking device for use in connection with a floor comprising rods movably positioned in structures mounted upon the floor, and a band attached to the rods adapted to embrace a wheel of a vehicle and to be tightened thereon by the movement of one of said rods.

2. A wheel locking device for use in connection with a floor comprising rods movably positioned in structures mounted upon the floor, and means attached to the rods adapted to hold a wheel of a vehicle and to be tightened thereon by the movement of one of said rods.

3. A wheel locking device for use in connection with a floor comprising rods movably positioned in structures mounted upon the floor, a band attached to the rods adapted to embrace a wheel of a vehicle, and a ratchet and pawl arrangement on the end of one of the rods to rotate it.

4. A wheel locking device for use in connection with a floor, side structures mounted upon the floor having vertical and horizontal slots therein spaced apart, rods movably positioned in the slots, a gripping band attached to the rods adapted to embrace a wheel of a vehicle and to be tightened thereon by the movement of the rod in the vertical slot, and means for rotating the latter rod to tighten the said bands.

5. In a freight car, a wheel locking device comprising rods movably positioned in the car body, and a band attached to the rods adapted to embrace a wheel of a vehicle and to be tightened thereon by the movement of one of the said rods.

6. In a freight car, a wheel locking device comprising rods movably positioned in the car body, and a band attached to the rods adapted to embrace a wheel of a vehicle and to be tightened thereon by the movement of one of the said rods, one of said rods being also movable vertically against the wheels.

7. In a freight car, a wheel locking device comprising rods movably positioned in the car body, and a band attached to the rods and adapted to embrace a wheel and to be tightened thereon by the rotation of one of said rods.

8. In a freight car, a wheel locking device comprising rods movably positioned in the car body, and a band attached to the rods and adapted to embrace a wheel and to be tightened thereon by the rotation of one of said rods, the latter being movable upwardly against the wheel.

9. In a freight car, a wheel locking device comprising rods movably positioned in the car body, and a band attached to the rods and adapted to embrace a wheel and to be tightened thereon by the rotation of one of said rods, the latter being movable upwardly against the wheel in grooves formed in the side of the car.

10. In a freight car, a wheel locking device comprising rods movably positioned in slots in the side of the car, said slots having extensions to permit rods to pass into grooves in the car floor, and locking bands attached to the rods and means for tightening them.

11. In a freight car, a wheel locking device comprising rods movably positioned in slots in the side of the car, said slots having extensions to permit rods to pass into grooves in the car floor, and locking bands attached to the rods and means for tightening them, one of said rods being also movable upwardly and against the wheels.

12. In a freight car, a wheel locking device comprising a rod positioned in horizontal slots in the sides of the car and movable below the floor level thereof, a wheel band attached thereto, a rotatable rod positioned in vertical slots in the sides of the car and having the other end of the band attached thereto.

13. In a freight car, a wheel locking device comprising a rod positioned in horizontal slots in the sides of the car and movable below the floor level thereof, a wheel band attached thereto, a rotatable rod positioned in vertical slots in the sides of the car and having the other end of the band attached thereto, said latter rod provided with a ratchet wheel, a pawl cooperating with the ratchet, a plate sliding in vertical guideways and carrying the pawl.

14. A wheel locking device for use in connection with a floor comprising rods movably positioned in horizontal and vertical slots provided in side walls mounted on the floor, and bands attached to the rods for securing wheels of vehicles in a fixed position on the floor.

15. A wheel locking device for use in connection with a floor comprising rods movably positioned in vertical slots provided in side walls mounted on the floor, and means attached to the rods for securing wheels of vehicles against movement along the floor.

In testimony that I claim the foregoing, I have hereunto set my hand this 6th day of April, 1922.

CHARLES FOWLER.